United States Patent
Nielsen et al.

(10) Patent No.: US 11,474,124 B2
(45) Date of Patent: Oct. 18, 2022

(54) FLUID PROBE WITH HEAT SPREADER STRUCTURE AND THERMAL ENERGY SOURCE

(71) Applicant: Raytheon Company, Waltham, MA (US)

(72) Inventors: Scott D. Nielsen, Sahuarita, AZ (US); Samuel T. Craig, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 253 days.

(21) Appl. No.: 16/871,533

(22) Filed: May 11, 2020

(65) Prior Publication Data
US 2021/0349119 A1 Nov. 11, 2021

(51) Int. Cl.
| G01P 5/165 | (2006.01) |
| G01F 1/46 | (2006.01) |
| F28D 21/00 | (2006.01) |
| F28D 15/02 | (2006.01) |

(52) U.S. Cl.
CPC .......... *G01P 5/165* (2013.01); *G01F 1/46* (2013.01); *F28D 15/0233* (2013.01); *F28D 2021/0021* (2013.01)

(58) Field of Classification Search
CPC ... G01P 5/16; G01P 5/165; G01F 1/46; F28D 15/02–0291; F28D 2015/0216–0291; F28D 2021/005; F28D 2021/0021
See application file for complete search history.

(56) References Cited

U.S. PATENT DOCUMENTS

| 2,706,408 A | * | 4/1955 | Holbrook | G01F 1/46 |
| | | | | 73/861.68 |
| 4,275,603 A | * | 6/1981 | Kalocsay | G01P 5/165 |
| | | | | 73/182 |
| 2015/0359976 A1 | * | 12/2015 | Richards | A61M 5/44 |
| | | | | 604/113 |
| 2017/0029125 A1 | | 2/2017 | Sarno | |
| 2019/0293676 A1 | * | 9/2019 | Jacob | B22F 10/20 |

FOREIGN PATENT DOCUMENTS

JP      S5912507 A     7/1984

* cited by examiner

*Primary Examiner* — Justin N Olamit
(74) *Attorney, Agent, or Firm* — Renner, Otto, Boisselle & Sklar, LLP

(57) ABSTRACT

A fluid probe includes a heat spreader structure that defines therein a fluid chamber that is in fluid communication with an external environment of the probe, and a thermal energy source in thermal communication with the heat spreader structure. The heat spreader structure may be made from heat pipes, which function as both temperature-control elements and structural elements. The thermal coupling of the heat spreader structure and the thermal energy source may be used to transfer heat between the two, heating, cooling, and/or maintaining temperature of the heat spreader structure. The fluid probe may have any of a variety of uses, for example being a pitot tube for an aircraft, a fluid sampling device, a medical device, or a device for injecting a fluid.

19 Claims, 4 Drawing Sheets

FLUID PROBE WITH HEAT SPREADER STRUCTURE AND THERMAL ENERGY SOURCE

FIELD OF THE INVENTION

The invention is in the field of fluid probes in fluid communication with their surrounding environment.

DESCRIPTION OF THE RELATED ART

Pitot tubes are widely used in aerospace vehicles and scientific devices. They are used to calculate airspeed, with a tube of the pitot tube device protruding forward from a body of the device to sample dynamic pressure and static pressure from undisturbed air flow. Built-in electrical heaters have been used to help keep pitot tubes free of ice during flight, since ice can block the pitot tube and/or result in erroneous readings from pitot tubes. A goal in the design of a pitot tube device is to minimize cross-sectional area normal to the airflow past the tube, in order to minimize aerodynamic drag. In prior configurations, the tube structure and fairing play a negligible role in the conduction of heat to the tip, and instead an auxiliary heat spreader is necessary for remote tip heating, which yields pitot diameter increase. As a result, prior configurations integrate a heating element locally to the tip, which increases probe device diameter beyond that of the tube structure. Additionally, since the tube structure remains a relatively thermally resistive element in these configurations, an aerodynamic fairing is added around the device probe tube to reduce parasitic heat loss to the surroundings, which again further increases the overall probe device diameter. Inefficient thermal designs mean that pitot tube electrical heaters can consume a large amount of power.

It would be beneficial if shortcomings of prior arrangements were reduced or avoided.

SUMMARY OF THE INVENTION

In a general embodiment, a fluid probe includes a heat spreader structure, and a thermal energy source in thermal communication with the heat spreader structure. The thermal energy source may be used to heat, cool, and/or maintain the temperature of the heat spreader structure.

According to an aspect of the invention, a temperature-controlled fluid probe includes: a heat spreader structure that defines a fluid chamber therein that is in fluidic communication with an external environment around the probe; and a thermal energy source in thermal communication with the heat spreader structure; wherein the thermal energy source transfers heat between the heat spreader structure and the thermal energy source.

According to an embodiment of any paragraph(s) of this summary, the heat spreader structure includes heat pipes.

According to an embodiment of any paragraph(s) of this summary, the heat pipes have non-circular cross sections.

According to an embodiment of any paragraph(s) of this summary, the heat pipes are attached together.

According to an embodiment of any paragraph(s) of this summary, the heat pipes are attached by welding, brazing, soldering, adhesive attaching (for example by use of suitable epoxy or other adhesives) or mechanical binding with a wrapping, such as a shrink sleeve or composite winding.

According to an embodiment of any paragraph(s) of this summary, the heat pipes have circular cross sections.

According to an embodiment of any paragraph(s) of this summary, the heat spreader elements are arrayed around a periphery of the fluid probe.

According to an embodiment of any paragraph(s) of this summary, the probe further includes a central heat spreader element surrounded by the heat spreader elements arrayed around the periphery of the fluid probe.

According to an embodiment of any paragraph(s) of this summary, the fluid chamber includes interstitial spaces between the central heat spreader element and the heat spreader elements.

According to an embodiment of any paragraph(s) of this summary, the heat spreader structure is at a tip of the fluid probe.

According to an embodiment of any paragraph(s) of this summary, the heat spreader structure includes multiple heat spreader elements attached together.

According to an embodiment of any paragraph(s) of this summary, the fluid probe further includes a sampling tube that surrounds the fluid chamber, between the heat spreader structure and the fluid chamber.

According to an embodiment of any paragraph(s) of this summary, the heat spreader structure includes multiple heat spreader elements attached to the sampling tube.

According to an embodiment of any paragraph(s) of this summary, the fluid probe includes an additional sampling tube that is attached to the heat spreader structure.

According to an embodiment of any paragraph(s) of this summary, the additional sampling tube is in fluid communication with external environment.

According to an embodiment of any paragraph(s) of this summary, the additional sampling tube and the fluid chamber are in fluid communication with different portions of the external environment.

According to an embodiment of any paragraph(s) of this summary, the thermal energy source includes a heater.

According to an embodiment of any paragraph(s) of this summary, the heater is a resistive electrical heater.

According to an embodiment of any paragraph(s) of this summary, the thermal energy source includes a cooler.

According to an embodiment of any paragraph(s) of this summary, the thermal energy source includes a thermal reservoir.

According to an embodiment of any paragraph(s) of this summary, the fluid probe is a pitot tube.

According to an embodiment of any paragraph(s) of this summary, the fluid probe is a medical instrument for injecting and/or removing fluid from a body.

According to an embodiment of any paragraph(s) of this summary, the fluid probe is used for injecting and/or removing fluid from the external environment.

According to another aspect of the invention, method of maintaining a thermal condition of a fluid probe, the method including: providing a heat spreader structure as part of the fluid probe, wherein the heat spreader structure defines a fluid chamber therein that is in fluidic communication with an external environment around the probe, and wherein the heat spreader structure is in thermal communication with a thermal energy source of the fluid probe; and transferring heat between the heat spreader structure and the thermal energy source during operation of the fluid probe.

According to an embodiment of any paragraph(s) of this summary, the transferring heat includes heating the heat spreader structure.

According to an embodiment of any paragraph(s) of this summary, the transferring heat includes cooling the heat spreader structure.

According to an embodiment of any paragraph(s) of this summary, the transferring heat includes maintaining temperature of the heat spreader structure.

According to yet another aspect of the invention, an aircraft pitot tube includes: a heat spreader structure that defines within a dynamic pressure chamber; an additional sampling tube attached to the heat spreader structure, wherein the additional sampling tube has an opening therein, defining a static pressure chamber within the additional sampling tube; a thermal energy source in thermal communication with the heat spreader structure; wherein the thermal energy source transfers heat between the heat spreader structure and the thermal energy source.

According to an embodiment of any paragraph(s) of this summary, the thermal energy source includes a heater that provides heating to the heat spreader structure during operation, to thereby inhibit icing of the pitot tube.

According to an embodiment of any paragraph(s) of this summary, the heat spreader structure includes a series of heat pipes.

According to an embodiment of any paragraph(s) of this summary, the heat pipes are arrayed around the dynamic pressure chamber.

According to an embodiment of any paragraph(s) of this summary, the heat spreader structure includes a central heat pipe surround by periphery heat pipes.

According to an embodiment of any paragraph(s) of this summary, the dynamic pressure chamber includes interstitial spaces between the central heat pipe and the periphery heat pipes.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

In a general embodiment, a fluid probe includes a heat spreader structure that defines therein a fluid chamber that is in fluid communication with an external environment of the probe, and a thermal energy source in thermal communication with the heat spreader structure. The heat spreader structure functions as both temperature-control elements and structural elements. A variety of separate structure elements, such as the heat pipes, may combine to form the heat spreader structure. The thermal energy source may be used to maintain the temperature of the heat spreader structure, such as by heating and/or cooling the heater spreader structure. This may help maintain the temperature of the fluid within the fluid chamber. More broadly, the thermal communication (or coupling) of the heat spreader structure and the thermal energy source may be used to transfer heat between the two, heating, cooling, and/or maintaining temperature of the heat spreader structure. The heating or cooling may also (or alternatively) be used for other purposes, such as to prevent ice from forming on a tip of the fluid probe. The fluid probe may also include a tube that surrounds the fluid chamber, may further have one or more additional chambers in fluidic communication with the external environment. The fluid probe may have any of a variety of uses, for example being a pitot tube for an aircraft, a fluid sampling device, a medical device, or a device for injecting a fluid.

Figure 1:
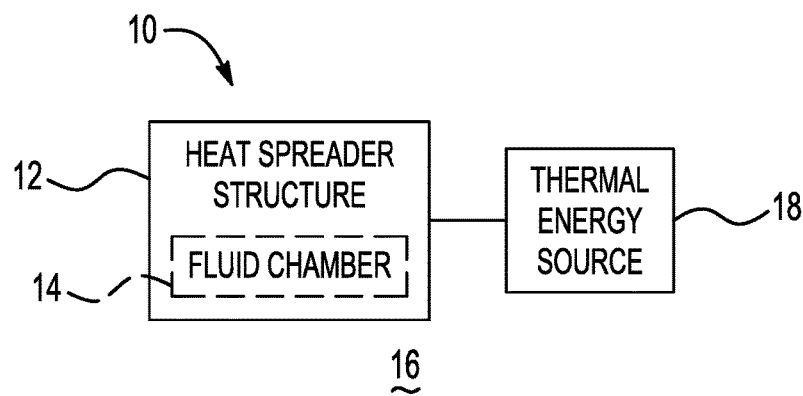
FIG. 1 is a block diagram of a fluid probe according to an embodiment of the invention.

FIG. 1 shows a block diagram of a fluid probe 10. The fluid probe 10 includes a heat spreader structure 12 that at least in part defines within a fluid chamber 14 that is in fluid communication with an environment 16 external to the fluid probe. The heat spreader structure 12 is thermally coupled to a thermal energy source 18. The thermal energy source 18 represents any of a variety of heaters, coolers, or thermal reservoirs, which may be used to transfer heat to and/or from the structure 12. The thermal energy source 18 may be used to maintain or control the temperature of the heat spreader structure 12, and/or to maintain or control the temperature of the fluid in the fluid chamber 14.

The heat spreader structure 12 is made up of elements that serve both as structural elements, in supporting the structure of the probe 10, and in allowing transmission of heat therethrough. One example of such an element is a heat pipe, which is a device with a working fluid therein, that uses thermal conductivity and phase change to transfer heat in a cycle between opposite ends of the heat pipe. A heat pipe has a wicking material around inner edges of a casing. In a cycling internal process within the heat pipe, the working fluid flows in liquid form along the wicking material by means of capillary forces, from a cold end of the heat pipe, which acts as a condenser, to the heat pipe's hot end, which acts as an evaporator. At the hot end the working fluid is heated to become gaseous vapor. The working fluid as a gas flow from the heat pipe's hot end to its cold end, along a central cavity or core that is free of the wicking material, due to the higher vapor pressure in the evaporator versus the condenser. At the cold end the gaseous working material cools and condenses again at the wicking material, starting the flow cycle over again. Heat pipes may have, for example, an effective thermal conductivity of from 10,000 W/m/K to 40,000 W/m/K. The heat transfer of the heat pipe may be used to maintain temperature, or otherwise transfer heat, in a fluid probe. For example the heat transfer in heat pipes may be used to prevent icing of a pitot tube, one type of fluid probe.

Heat pipes are not the only possible elements for the heat spreader structure 12. One alternative is a solid material with high thermal conductivity, for example annealed pyrolytic graphite or graphene. Broadly speaking, the heat spreader structure may be composed of heat transfer elements with a thermal conductivity of from 1,000 W/m/K to 10,000 W/m/K or to 40,000 W/m/K, to give nonlimiting ranges. Such high thermal conductivities may enable remote tip heating whilst providing probe diameters (such as for pitot tubes) that are smaller than (or comparable to) those of prior configurations. Limiting the size of a probe, such as a pitot tube, may make for better performance, such as by decreasing drag in an airflow.

The term "structural element" is used herein to indicate a part that provides and/or maintains shape and/or rigidity of the part of the fluid probe 10 that interacts with the environment in fluidic communication with the fluid chamber 14. In providing shape and/or rigidity the structural elements, either individually or collectively, may provide the majority of rigidity of the structure of that part of the fluid probe, for example maintaining the structural integrity (shape and/or rigidity) of a free-standing tip portion of the fluid probe. Looked at another way, the structural elements may provide essential structural support to the fluid probe 10, or the part of the fluid probe 10 that interacts with the environment, such that removal of some, most, and/or all of the structural elements may leave the probe 10 structural deficient for performing its intended purpose, whatever that purpose may be. For example, the heat spreader structure 12 may be used to maintain the shape of a free or distal end of the fluid probe (a tip of the fluid probe), where the probe interacts with the environment. Alternatively or in addition, the heat spreader structure 12 may make up the majority of the weight, volume, and/or structural strength of the portion of the fluid probe 10 (such as the tip) in which the heat spreader structure 12 is located.

The heat spreader structure 12 may constitute the outer walls of a portion of the fluid probe 10, for example constituting all of part of the outer walls of a free end or tip of the fluid probe 10. Alternatively or in addition, the heat spreader structure 12, in conjunction with the thermal energy source 18, may constitute a thermal barrier between the outer environment 16 and the fluid chamber 14.

Figure 2:
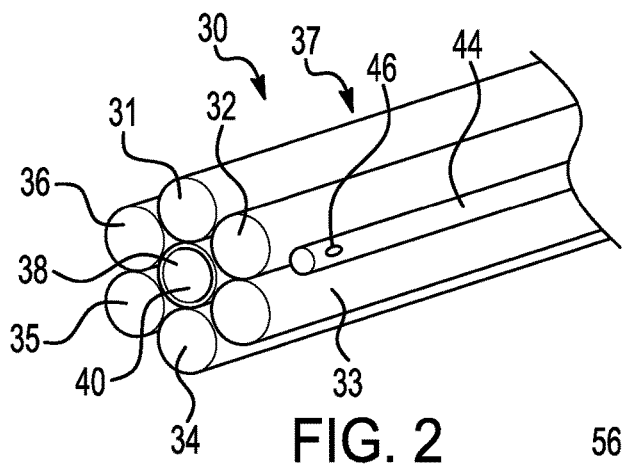
FIG. 2 is an oblique view of a fluid probe according to a second embodiment of the invention.

FIG. 2 shows a fluid probe 30, which functions as a pitot tube. The fluid probe 30 includes six heat pipes 31, 32, 33, 34, 35, and 36, arranged in a hexagonal pattern to form a heat spreader structure 37 around a central tube or sampling tube 38. The central tube 38 is a hollow tube that surrounds a fluid chamber 40 therein that is open to the air, open facing forward, toward a leading side of the pitot tube probe 30. This functions as the dynamic pressure part of the pitot tube 30. An additional tube 44 may be positioned as a static tube, with a hole 46 toward the side, to measure static pressure in the environment around the pitot tube probe 30. The heat pipes 31-36 may be operably (thermally) coupled to a heater or temperature source (a thermal energy source), for example to heat the probe 30 sufficiently to avoid formation of ice during flight.

Sampling tubes such as the central tube 38 may be used for any of a variety of reasons. For example the central tube 38 may be made of a different material from that of the heat pipes 31-36, a material selected for compatibility of the fluid of the environment around the probe 30, of a fluid that may otherwise be in or pass through fluid chamber 40. The term "sampling tube" should be construed broadly as referring to a tube of whatever cross-sectional shape, that encloses and contacts a fluid chamber for receiving fluid or having fluid pass through, for any of a variety of purposes, some of which may involve operations beyond sampling, such as for injecting or otherwise introducing a fluid into a surrounding environment for any of a variety of purposes, such as for medical injection of fluids.

Whether or not the central tube 38 is present or is omitted, the heat spreader structure 37 defines at least in part the fluid chamber 40. Where the central tube 38 is omitted the heat spreader structure 37 directly defines the shape and volume of the fluid chamber 40. Even when the central tube 38 is present the heat spreader structure 37 at least partially defines the fluid chamber 40, at least by maintaining the shape and configuration of the central tube 38, even if there is no direct contact between the fluid within the chamber 40, and the heat pipes 31-36 of the heat spreader structure 37.

Figure 3:
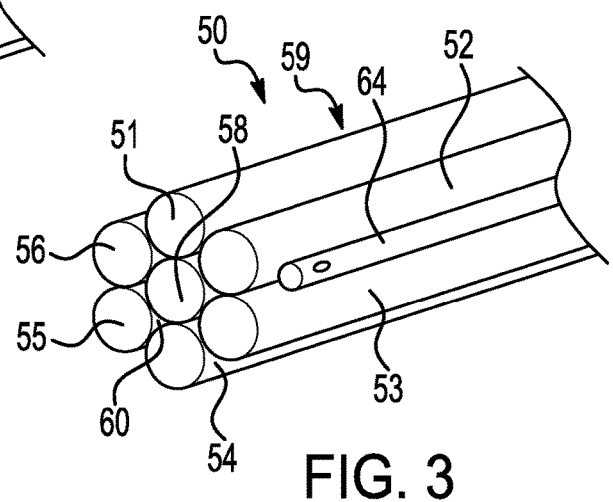
FIG. 3 is an oblique view of a fluid probe according to a third embodiment of the invention.

FIG. 3 shows a variation, a fluid probe 50 similar to the probe 30 (FIG. 2), but with the central tube 38 (FIG. 2) replaced by a heat pipe 58, surrounded by six other heat pipes 51, 52, 53, 54, 55, and 56, arranged in a hexagonal pattern around the central heat pipe 58. The central heat pipe 58 may protrude out further than the other heat pipes 51-56. The heat pipes 51-56 and 58 together constitute a heat spreader (heat pipe) structure 59. The probe 50 may also be a pitot tube probe, with dynamic (total) pressure obtained from interstitial openings 60 at the junctions between the central heat pipe 58 and the surrounding heat pipes 51-56. In such a configuration the volume within one or more of the interstitial openings 60 constitutes the fluid chamber of the probe 50. An additional tube 64, similar to the additional tube 44 (FIG. 2), may be used to obtain the static pressure. As with the probe 30, the heat pipes 51-56 and 58 may be thermally coupled to a heater or temperature reservoir, for example to maintain a temperature of the fluid probe 50 that avoids icing.

Having the central heat pipe 58 extend into the flow beyond the surrounding heat pipes 51-56 may provide advantageous characteristics to the resulting pitot tube. If the oncoming flow was not normal to the probe length axis, this would put some of the total pressure interstitial flow passages 60 in the "shadow" of the tip of the center heat pipe 58. In other words, some of the total pressure passages 60 would be windward and some would be leeward. Individual passages of the passages 60 would then sense different total pressure, and the ratios from the pressures of different of the passages 60 could be compared, to enable computation of angle of attack and/or beta (or sideslip) angle.

Figure 4:
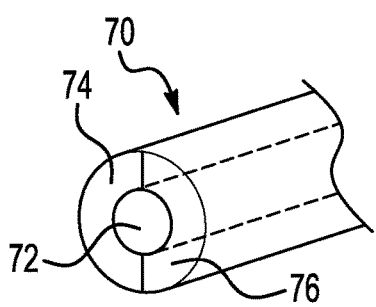
FIG. 4 is an end view of a fluid probe according to a fourth embodiment of the invention.
Figure 5:
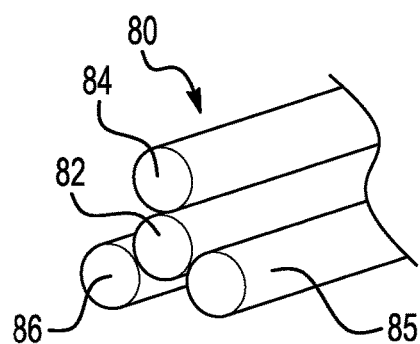
FIG. 5 is an end view of a fluid probe according to a fifth embodiment of the invention.
Figure 6:
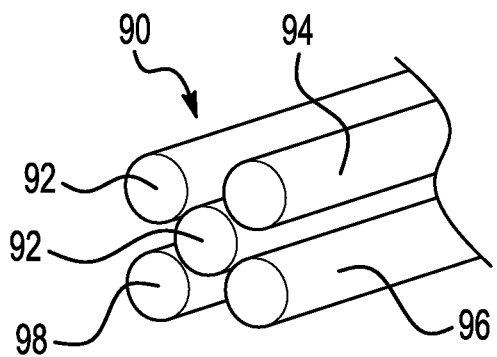
FIG. 6 is an end view of a fluid probe according to a sixth embodiment of the invention.
Figure 7:
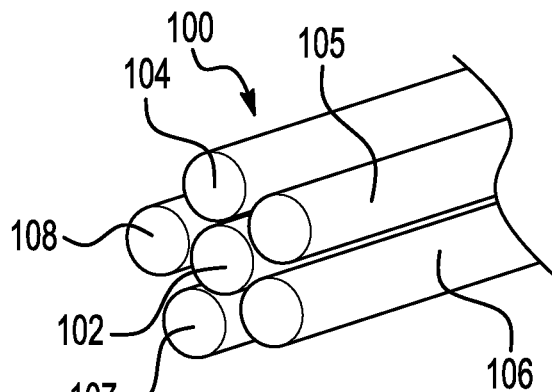
FIG. 7 is an end view of a fluid probe according to a seventh embodiment of the invention.

Many variations are possible for the arrangement of structural heat spreaders such as the heat pipes shown as structural parts of the fluid probe 30 (FIG. 2) and the fluid probe 50 (FIG. 3). FIG. 4 shows a fluid probe 70 that includes a sampling tube 72 surrounded by a pair of semi-annular heat spreaders 74 and 76, for example suitably-shaped heat pipes. FIG. 5 shows a fluid probe 80 with a central sampling tube 82 surrounded by three heat spreaders (such as heat pipes) 84, 85, and 86. FIG. 6 shows a fluid probe 90 with a central sampling tube 92 surrounded by four heat spreaders (such as heat pipes) 94, 95, 96, and 97. FIG. 7 shows a fluid probe 100 with a central sampling tube 102 surrounded by five heat spreaders (such as heat pipes) 104, 105, 106, 107, and 108.

Figure 8:
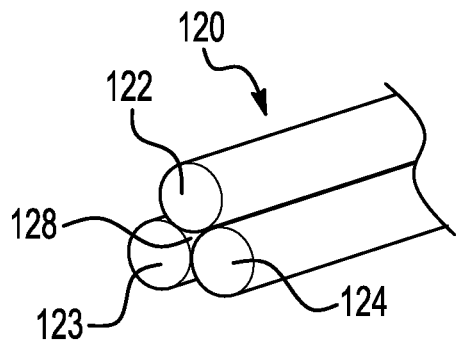
FIG. 8 is an end view of a fluid probe according to an eighth embodiment of the invention.
Figure 9:
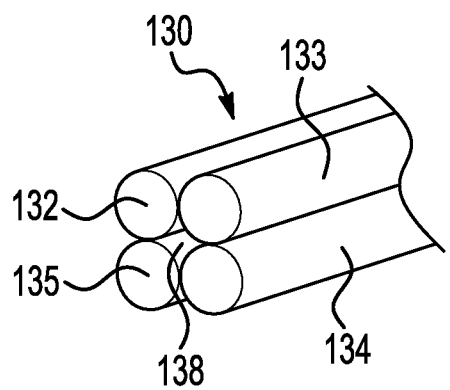
FIG. 9 is an end view of a fluid probe according to a ninth embodiment of the invention.
Figure 10:
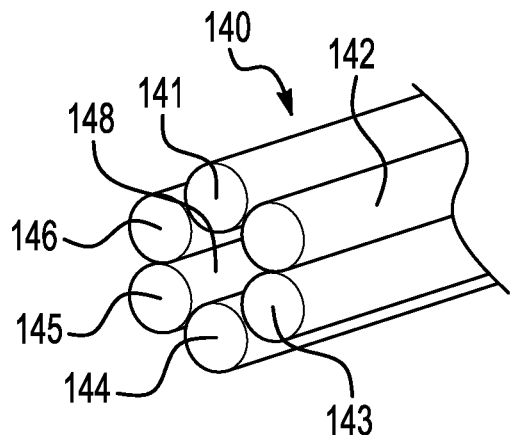
FIG. 10 is an end view of a fluid probe according to a tenth embodiment of the invention.

Relatedly, a variety of configurations may be used for a probe that relies on one or more interstitial spaces for use as a fluid chamber. FIG. 8 shows a fluid probe 120 with three heat spreaders (or heat pipes) 122, 123, and 124 around an interstitial fluid chamber or space 128. FIG. 9 shows a fluid probe 130 with four heat spreaders (or heat pipes) 132, 133, 134, and 135 around an interstitial fluid chamber or space 138. FIG. 10 shows a fluid probe 140 with six heat spreaders (or heat pipes) 141, 142, 143, 144, 145, and 146, around an interstitial fluid chamber or space 148.

Many configurations are also possible that use additional sampling tubes, akin to the additional tube 44 (FIG. 2) and the additional tube 64 (FIG. 3). Such additional tubes may provide additional fluid chambers in fluid communication with the surrounding environment, or parts of the surrounding environment, for any of a variety of purposes, such as fluid sampling of parts of the environment (such as for determining pressure, temperature, or other characteristics, or for obtaining fluid composition, or for sampling for other purposes), or for injecting a fluid into different parts of the surrounding environment (and/or for injecting different fluids). The purposes given above for the additional tubes are intended to be non-limiting examples as opposed to an exhaustive list, and it should be appreciated that different combinations of uses of and/or purposes for various fluid chambers may be combined in a single fluid probe or device.

Figure 11:
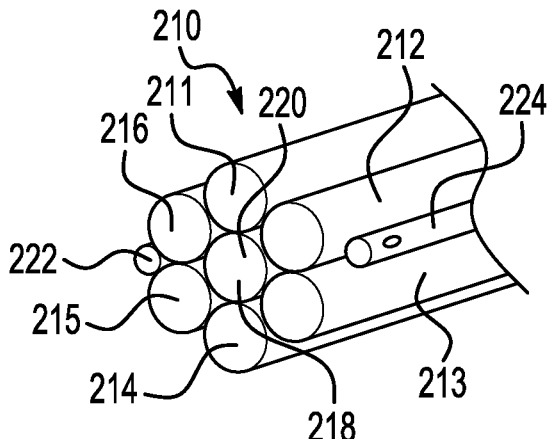
FIG. 11 is an end view of a fluid probe according to an eleventh embodiment of the invention.
Figure 12:
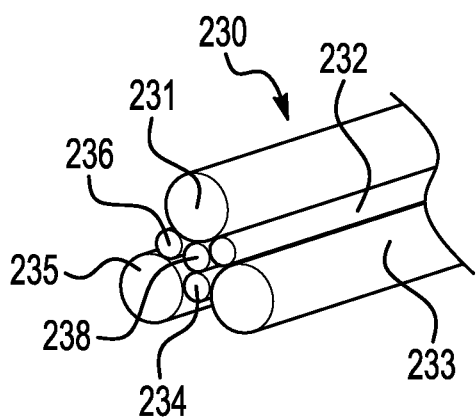
FIG. 12 is an end view of a fluid probe according to a twelfth embodiment of the invention.
Figure 13:
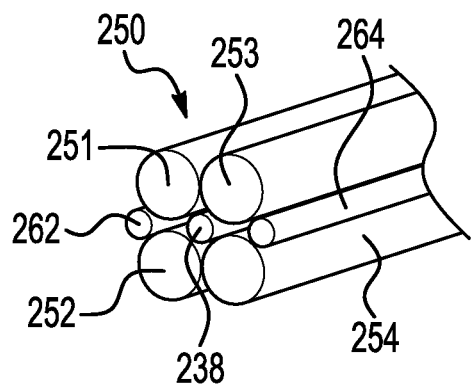
FIG. 13 is an end view of a fluid probe according to a thirteenth embodiment of the invention.
Figure 14:
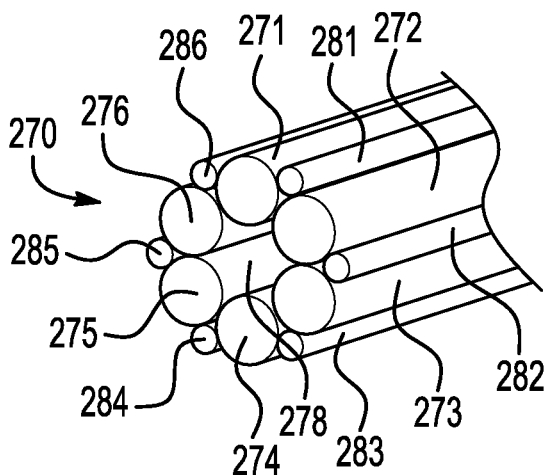
FIG. 14 is an end view of a fluid probe according to a fourteenth embodiment of the invention.

FIG. 11 shows a variant of the fluid probe 30 (FIG. 2), a fluid probe 210 that has six heat spreaders (or heat pipes) 211, 212, 213, 214, 215, and 216, in a hexagonal pattern surrounding a central tube 218 that defines a fluid chamber 220 therein. The fluid probe 210 also includes a pair of additional tubes 222 and 224, which are on the perimeter of the fluid probe 210 and which are in fluid communication with different parts of the environment surrounding the fluid probe 210. FIG. 12 shows a fluid probe 230 that includes a central tube 238 surrounded by alternating heat spreaders (or heat pipes) 231, 233, and 235, and secondary tubes 232, 234, and 236. FIG. 13 shows a fluid probe 250 that includes four heat spreaders 251, 252, 253, and 254 around a central tube 258, with a pair of additional tubes 262 and 264. The additional tubes 262 and 264 are along the perimeter of the fluid probe 250, with the additional tube 262 in contact with the heat spreaders 251 and 252, and with the additional tube 264 in contact with the heat spreaders 253 and 254. FIG. 14 shows a further embodiment, a fluid probe 270 which has heat spreaders 271, 272, 273, 274, 275, and 276 around a central fluid chamber 278, with an equal number of additional tubes 281, 282, 283, 284, 285, and 286 each contacting a pair of the heat spreaders 271-276.

Figure 15:
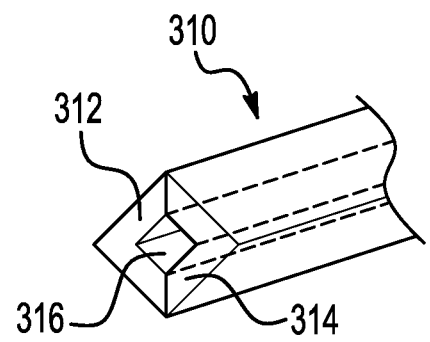
FIG. 15 is an end view of a fluid probe according to a fifteenth embodiment of the invention.
Figure 16:
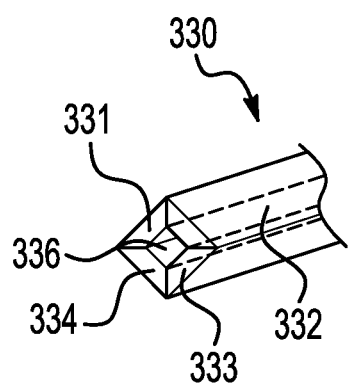
FIG. 16 is an end view of a fluid probe according to a sixteenth embodiment of the invention.
Figure 17:
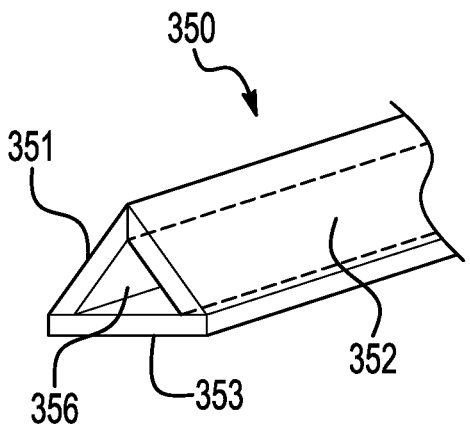
FIG. 17 is an end view of a fluid probe according to a seventeenth embodiment of the invention.

The heat spreaders, whether they are heat pipes or other materials, may have shapes other than round cross-section tubes. FIG. 15 shows a fluid probe 310 that has a pair of angled heat spreaders 312 and 314 that together constitute a square cross-section end of the probe 310, and which together define within a square cross-section fluid chamber 316. FIG. 16 shows a variant, a fluid probe 330 that has four heat spreaders 331, 332, 333, and 334. The heat spreaders 331-334 together constitute a square cross-section end of the probe 330, and which together define within a square cross-section fluid chamber 336. FIG. 17 shows another variant, a fluid probe 350 that has three heat spreaders 351, 352, and 353, which together constitute a triangular cross-section end of the probe 350, and which together define within a triangular cross-section fluid chamber 356.

Figure 18:
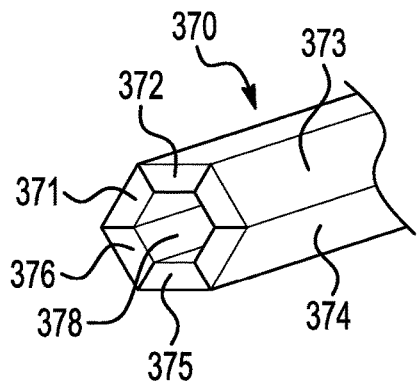
FIG. 18 is an end view of a fluid probe according to an eighteenth embodiment of the invention.
Figure 19:
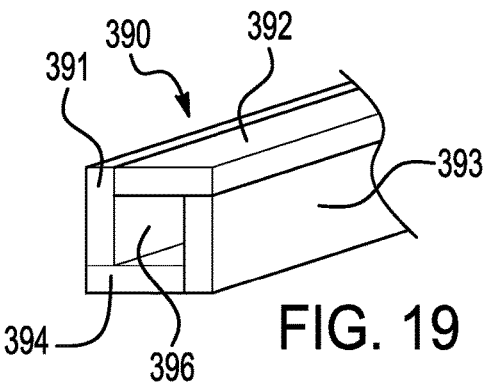
FIG. 19 is an end view of a fluid probe according to a nineteenth embodiment of the invention.

FIGS. 18 and 19 show further variants with polygonal probe cross-sectional areas, and corresponding polygonal cross-sections for fluid chambers. FIG. 18 shows a hexagonal fluid probe 370 formed from six heat spreaders 371, 372, 373, 374, 375, and 376, defining a hexagonal cross-section fluid chamber 378. FIG. 19 shows a probe 390 that has a square cross-section made up of heat spreaders 391, 392, 393, and 394, joined together at lapped ends, and together defining a square cross-section fluid chamber 396.

It will be appreciated that many other polygonal cross-sections for the probe are possible. In addition it should be understood that such polygonal cross-sections may be regular or irregular polygons, and/or may be convex or concave, and/or that the fluid chamber and the surrounding parts of the probe (in particular the surrounding heat spreaders) may have different shapes. Further it will be appreciated other shapes are possible, such as combination of curved and straight sections.

The various features of the many embodiment shown in FIGS. 2-19 may be combined in a single embodiment, with different features drawn from different individual embodiments, in any suitable combination. Furthermore, features explained regarding one embodiment also may be applied to other embodiments, for example with a heater or temperature reservoir (or other heating, cooling, and/or temperature-stabilization device) being thermally coupled to heat spreaders of a fluid probe.

The heat spreaders in the various embodiments may be joined to each other and to other parts (such as tubes that define fluid chambers) by any of a variety of suitable methods or means of attachment. Examples include welding, brazing, and soldering, and adhesively attaching, for example by use of suitable epoxy or other adhesives. Another example is mechanical binding with a wrapping, such as a shrink sleeve or composite winding.

The fluid probes described above may be employed in any of a variety of ways. As described above, the fluid probe may be a pitot tube, used for measuring dynamic and static pressure for determining airspeed of an air vehicle such as an airplane or unmanned aerial vehicle (UAV) or drone. Alternatively the fluid probe may be used for a wide variety of other fluid sampling applications, such as in wind tunnels, various sorts of laboratory experiments and academic research, and in heating, ventilation, and air conditioning (HVAC) systems and applications. The probes may also be used for introducing and/or withdrawing fluids in situations where temperature control or heating/cooling is desirable. A broad category of such situations is in medical applications, where it may be desirable to inject or remove fluids from a body in a temperature-controlled fashion. Another broad category of such situations is in materials processing methods and operations.

The thermal energy source coupled to the heat spreader structure of the fluid probes described herein can take any of a variety of forms. The thermal energy source can be (or can include) a heater, such as an electrical resistive heater; a cooler, such as a thermoelectric cooler; a device for maintaining temperature and/or transferring heat, such as a heat exchanger; or a thermal reservoir, such as a heat sink. Thermal energy sources are not illustrated in FIGS. 2-19, but it will be appreciated that all of the configurations of heat spreader structure in these embodiments are thermally coupled to (or may be thermally coupled to) a thermal energy source, for example any of the various sources described in this paragraph.

Figure 20:
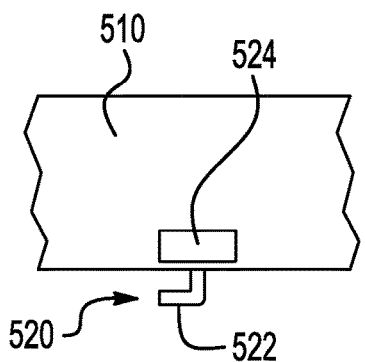
FIG. 20 shows use of a fluid probe as a pitot tube on an aircraft, according to an embodiment of the invention.

FIGS. 20-23 illustrate various uses for fluid probes, such as those in the various embodiments described above. FIG. 20 shows an aircraft 510 that includes a pitot tube 520 that has aspects of one or more of the various fluid probes described above, such as a heat spreader structure 522, and a thermal energy source 524 thermally coupled to the heat spreader structure 522 to heat and/or maintain temperature of the heat spreader structure 522. Such heating and/or maintenance of temperature may be used to prevent or discouraging icing of the pitot tube 520. Such icing may cause loss of function in a pitot tube, and therefore is to be avoided. The use of the probe 520, with the heat spreader structure 522 that provides both structural integrity and good heat transfer properties, aids in making the pitot tube probe 520 more compact, and therefore less disruptive to airflow around the aircraft 510, reducing drag. In addition the good heat transfer properties of the heat spreader structure 522 allow less usage of heating power than in some prior arrangements.

Figure 21:
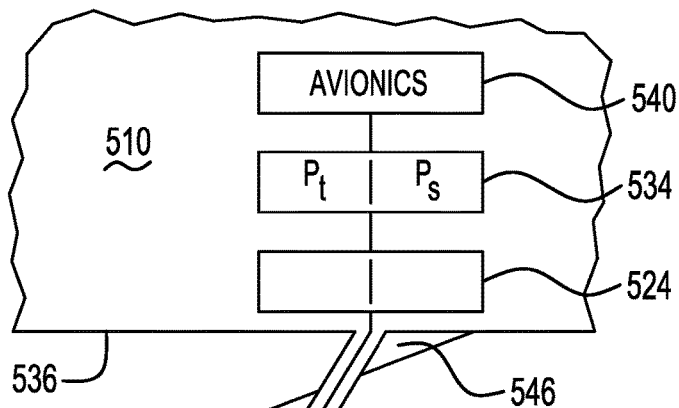
FIG. 21 shows a functional diagram of the pitot tube fluid probe of FIG. 20.

FIG. 21 shows a functional diagram of the pitot tube probe 520. The heat spreader structure 522 is part of a forward-protruding tip 530 of the pitot tube probe 520. The probe 520 allows determination of a dynamic pressure $P_t$ and a static pressure $P_s$. These pressures $P_t$ and $P_s$ are used by a pressure transducer 534 that is within an airframe 536 of the aircraft 510 to create electrical signals interpreted by avionics 540 of the aircraft 510. The signals from the pressure transducer 534 are used to determine the Mach number of the aircraft 510. The thermal energy source 524, for example an electrical resistive heater, may also be located in the airframe 536 of the aircraft 510. By using the heat spreader structure 522 itself as the forward-protruding tip 530 of the pitot tube probe 520, this configuration enables remote heating of the tip at very low (relative to the current state of the art amongst the prior configurations) heater power whilst maintaining very low (relative to the current state of the art amongst the prior configurations) heater temperatures. This yields a design that does not require a heating element local to the tip nor an aerodynamic fairing covering the tube structure and heating element, meaning that the size (diameter) of the pitot tube tip 530 may be kept small (and represents a diameter reduction versus that of the current state of the art amongst the prior configurations). Furthermore, dual use of the fluid tube structure is made in the pitot tube probe 520 (as well as in other embodiments described herein), since the structure serves the purpose of both defining the fluid chambers whilst also providing the advanced heat spreader structure. This combining of the tube structure and the heat spreader structure enables beneficial usage of the device diameter, and hence serves to further reduce the geometric size of the pitot tube device. Since the heat spreader structure 522 allows excellent heat transfer without being bulky, relatively moderate amounts of heating may be provided by the thermal energy source 524, while still controlling temperature of the tip 530 sufficiently to prevent icing. The probe 520 may be supported by additional structure outside of the airframe 536 and downstream of the probe tip 530, such as a pair of gussets 544 and 546.

The pitot probe 520 may be smaller and use less power than prior heated pitot tubes. For example the pitot probe may have a diameter near the tip 530 of 6.4 mm (0.25 inches) and may require 10 Watts (or less) of heating to achieve desired de-icing performance, as compared with prior local heating pitot tubes having a diameter of 12.7-13 mm (0.5-0.6 inches) and heating power of 100-200 Watts, and with prior remote heating pitot tubes having a diameter of 36.8 mm (1.45 inches), and a power consumption of 350 Watts. These numbers are only non-limiting examples, illustrating the improvement of an embodiment of the current invention.

Similar advantages of keeping device size small while still controlling temperature without large expenditures of power, may also be advantages in other embodiments described herein. It will be appreciated that it is advantageous to keep other sorts of devices, such as medical devices and industrial fluid sampling devices, of modest size.

Figure 22:
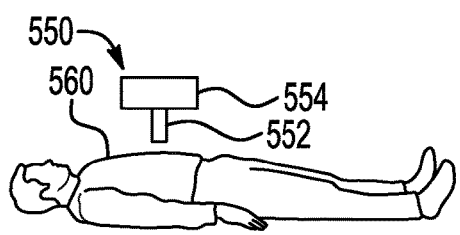
FIG. 22 shows use of a fluid probe as a medical device, according to another embodiment of the invention.

FIG. 22 shows a medical device probe 550 that includes a controlled-heat (or controlled-temperature) heat spreader structure 552 that is thermally coupled to a thermal energy source 554. The probe 550 may be inserted into a patient 560 to inject a fluid and/or to remove a sample, such as a sample fluid or a biopsy sample. It will be appreciated that it may be desirable to control temperature of the probe in such uses, for example to more closely match the temperature of the patient, such as for patient comfort or to avoid disruption to the body, and/or otherwise to provide a temperature suitable for the fluid or sample introduction or removal.

Figure 23:
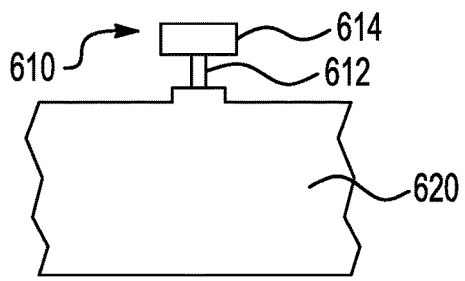
FIG. 23 shows use of a fluid probe as a fluid sampling/injection device, according to yet another embodiment of the invention.

FIG. 23 shows a probe 610 that is used to inject and/or remove fluid as part of a process, for example in a pipeline or container 620. The probe 610 includes a heat spreader structure 612 that is thermally coupled to a thermal energy source 614. It may be advantageous to use the probe 610 in situations where controlled temperature (or heating and/or cooling) may be beneficial for injection or removal of fluid, or to maintain operability of the probe 610, such as (for example) in situations where the probe 610 has to be inserted into an environment that is hot enough to damage an uncooled probe.

Figure 24:
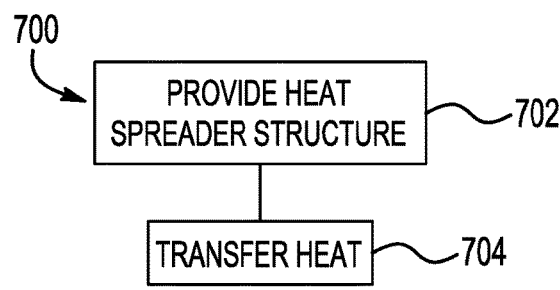
FIG. 24 is a high-level flow chart of a method of maintaining a thermal condition of a fluid probe, according to an embodiment of the invention.

FIG. 24 shows a high-level flowchart of a method 700 for use of a fluid probe, such as those described above in various embodiments. In step 702 a heat spreader structure is provided as part of the fluid probe. The heat spreader structure may define a fluid chamber therein that is in fluidic communication with an external environment around the probe, and the heat spreader structure may be in thermal communication with a thermal energy source of the fluid probe. In step 704 heat is transferred between the heat spreader structure and the thermal energy source during operation of the fluid probe. The transfer of heat may involve heating of the heat spreader structure, cooling of the heat spreader structure, and/or maintaining temperature of the heat spreader structure. These various types of heat transfer all may be collected under the concept of maintaining a thermal condition of the fluid probe.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid probe comprising:
a heat spreader structure that defines a fluid chamber therein that is in fluidic communication with an external environment around the probe; and
a thermal energy source in thermal communication with the heat spreader structure;
wherein the thermal energy source transfers heat between the heat spreader structure and the thermal energy source; and
wherein the heat spreader structure includes heat pipes, with each of the heat pipes configured to transfer heat via thermal conductivity, and via phase change of a working fluid internal to the heat pipe.

2. The fluid probe of claim 1, wherein the heat pipes are attached together.

3. The fluid probe of claim 1, wherein the heat pipes have circular cross sections.

4. The fluid probe of claim 1, wherein the heat spreader structure includes multiple heat spreader pipes attached together along outer surfaces of the heat spreader pipes.

5. The fluid probe of claim 1, wherein the fluid probe further includes a sampling tube that surrounds the fluid chamber, between the heat spreader structure and the fluid chamber.

6. The fluid probe of claim 5, wherein the heat spreader structure includes multiple heat spreader elements attached to the sampling tube.

7. The fluid probe of claim 1, wherein the fluid probe includes an additional sampling tube that is attached to the heat spreader structure along outer surfaces of the heat pipes.

8. The fluid probe of claim 7, wherein the additional sampling tube is in fluid communication with external environment.

9. The fluid probe of claim 8, wherein the additional sampling tube and the fluid chamber are in fluid communication with different portions of the external environment.

10. The fluid probe of claim 1, wherein the fluid probe is a pitot tube.

11. The fluid probe of claim 1, wherein the fluid probe is a medical instrument for injecting and/or removing fluid from a body.

12. The fluid probe of claim 1, wherein the fluid probe is used for injecting and/or removing fluid from the external environment.

13. A fluid probe comprising:
a heat spreader structure that defines a fluid chamber therein that is in fluidic communication with an external environment around the probe; and
a thermal energy source in thermal communication with the heat spreader structure;
wherein the thermal energy source transfers heat between the heat spreader structure and the thermal energy source;
wherein the heat spreader structure includes heat spreader elements that are arrayed around a periphery of the fluid probe; and
wherein the heat spreader elements have circular cross sections.

14. The fluid probe of claim 13,
further comprising a central heat spreader element surrounded by the heat spreader elements arrayed around the periphery of the fluid probe; and
wherein the fluid chamber includes interstitial spaces between the central heat spreader element and the heat spreader elements.

15. The fluid probe of claim 13, wherein the heat spreader elements include heat pipes, with each of the heat pipes configured to transfer heat via thermal conductivity, and via phase change of a working fluid internal to the heat pipe.

16. A fluid probe comprising:
a heat spreader structure that defines a fluid chamber therein that is in fluidic communication with an external environment around the probe; and
a thermal energy source in thermal communication with the heat spreader structure; and
wherein the thermal energy source transfers heat between the heat spreader structure and the thermal energy source;
wherein the heat spreader structure is at a tip of the fluid probe; and
wherein the heat spreader structure includes multiple heat spreader elements attached together along outer surfaces of the heat spreader elements.

17. The fluid probe of claim 16, wherein the heat spreader structure includes multiple heat spreader elements attached together.

18. An aircraft pitot tube comprising:
a heat spreader structure that defines a dynamic pressure chamber therein;
an additional sampling tube attached to the heat spreader structure, wherein the additional sampling tube has an opening therein, defining a static pressure chamber within the additional sampling tube;
a thermal energy source in thermal communication with the heat spreader structure;
wherein the heat spreader structure is at a tip of the pitot tube;
wherein the heat spreader structure transfers heat between the thermal energy source and an environment external to the pitot tube, and
wherein the heat spreader structure includes multiple heat pipes, with each of the heat pipes configured to transfer heat via thermal conductivity, and via phase change of a working fluid internal to the heat pipe.

19. An aircraft pitot tube comprising:
a heat spreader structure that defines a dynamic pressure chamber therein;
an additional sampling tube attached to the heat spreader structure, wherein the additional sampling tube has an opening therein, defining a static pressure chamber within the additional sampling tube;

a thermal energy source in thermal communication with the heat spreader structure;
wherein the heat spreader structure transfers heat between the thermal energy source and an environment external to the pitot tube;
wherein the heat spreader structure includes a central heat pipe surround by periphery heat pipes; and
wherein the dynamic pressure chamber includes interstitial spaces between the central heat pipe and the periphery heat pipes.

* * * * *